Apr. 24, 1923.
H. C. LORD
OSCILLATING JOINT
Filed Nov. 17, 1920
1,452,693
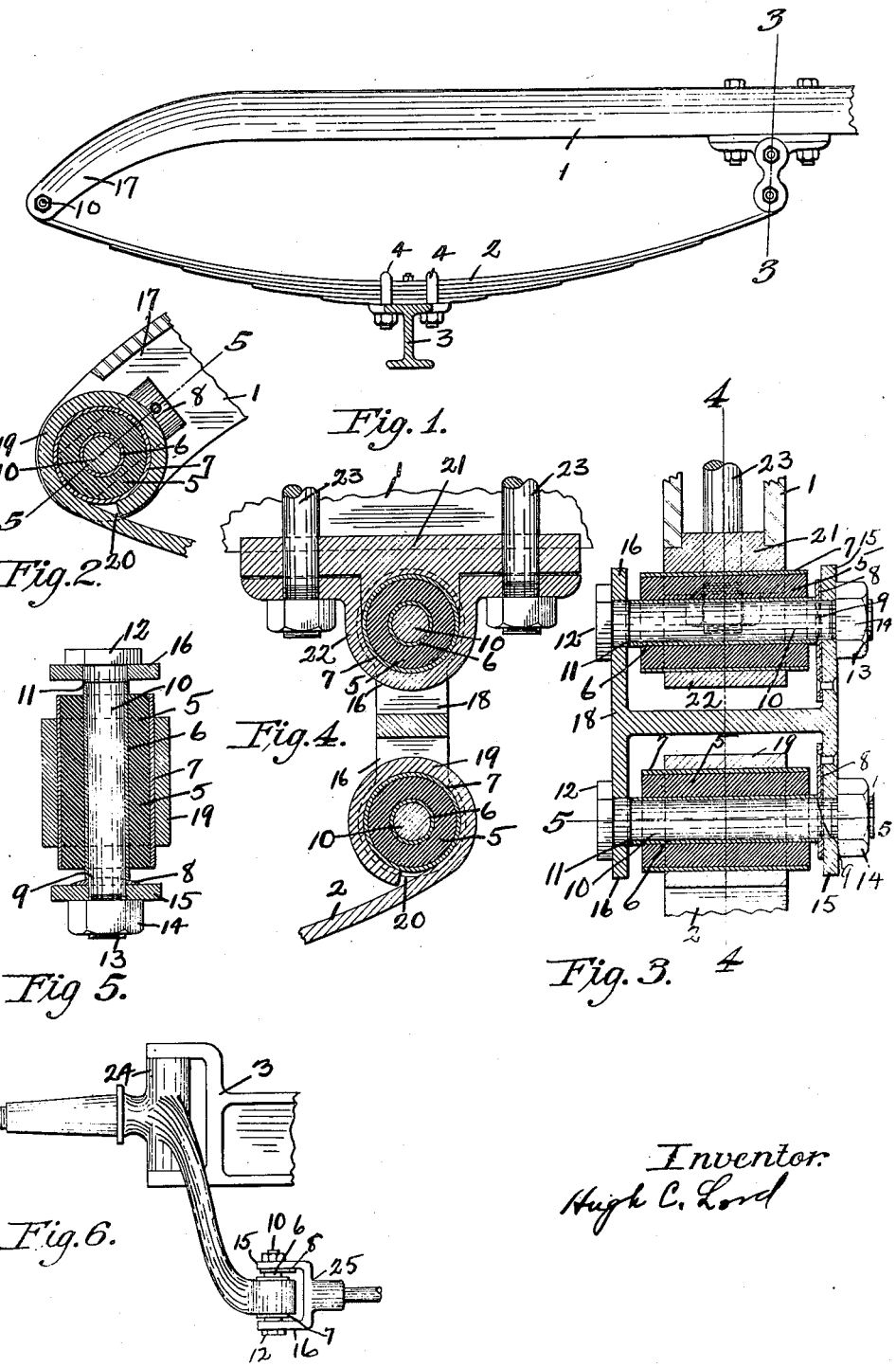

Patented Apr. 24, 1923.

1,452,693

UNITED STATES PATENT OFFICE.

HUGH C. LORD, OF ERIE, PENNSYLVANIA.

OSCILLATING JOINT.

Application filed November 17, 1920. Serial No. 424,788.

*To all whom it may concern:*

Be it known that I, HUGH C. LORD, a citizen of the United States, residing at Erie, in the county of Erie and State of Pennsylvania, have invented new and useful Improvements in Oscillating Joints, of which the following is a specification.

With many oscillating joints it is difficult to keep them tight and inconvenient to keep them lubricated. This is particularly true with relation to the oscillating joints used in automobile construction, such particularly as the joints formed between the springs and shackle bolts and the joints involved in the steering connections. The present invention is designed to form an oscillating joint which will remain tight or at least will not rattle and which obviates the necessity of lubrication.

The invention is illustrated in the accompanying drawings as follows:—

Fig. 1 shows a side elevation of the spring with the joints in place.

Fig. 2 a central vertical section through the front shackle bolt of the spring.

Fig. 3 a section on the line 3—3 in Fig. 1.

Fig. 4 a section on the line 4—4 in Fig. 3.

Fig. 5 a section on the line 5—5 in Fig. 2.

Fig. 6 an elevation of a steering knuckle showing the joint between the tie rod and steering knuckle.

1 marks the automobile frame. This is the ordinary channel construction. 2 marks the spring, 3 the axle, and 4 the clip securing the spring to the axle.

In forming the joint I provide a joint member 5 of rubber. This is preferably arranged between an outer steel shell 6 and an inner steel shell 7, the rubber being secured to these shells by vulcanization. A shackle bolt 10 is of a diameter fitting the shell 7 and preferably formed with a shoulder 11 engaging one end of the shell, the opposite end 9 of the shell having an irregular surface to adapt it to engage and lock on a key plate 8. As shown the end is concaved and engages the key plate 8 having a convex surface. The shackle bolt has a head 12 and screw threads 13 at the opposite end and is provided with the nut 14. The shackle bolt passes through the supporting plates 15 and 16. These may be the sides 17 of the channel 1 or the sides of the hanger 18. As the nut 14 is set up the shell 17 is clamped between the shoulder 11 and the locking plate 8 and thus locked against turning relatively to the plates 15 and 16.

The outer shell 6 is clamped in the eye 19 of the spring. This eye is usually formed by bending the spring, the end 20 being returned into close relation with the spring leaf. By expanding the eye 19 through the action of a wedge under the end 20 and the spring leaf it is possible to insert the shell 7 and upon releasing the eye the clamping action of the eye upon the shell will lock the shell with the spring.

With this joint so arranged the oscillating or relative movement between the two membars, that is, the plates 15 and 16 which may be a part of the frame or the hanger and the spring is entirely taken up through the distortion of the rubber, the rubber between the surfaces of the shells stretching sufficiently to permit the oscillating movement. This obviates entirely the necessity of lubrication and also obviates any possibility of rattling through the looseness of the joint. The rubber also yields slightly to shocks and thus adds to the spring action.

Where the load is such relatively to the width of the spring as to subject the rubber to undue strain a sufficient body of rubber may be interposed to sustain the load by extending the shells and consequently the length of the rubber member. This may be extended as far as may be necessary for this purpose. The extension is more desirable than an addition to the circumference because as the size is increased the stretching action is increased with a given oscillatory movement.

I prefer to lock the rubber member with the spring at the position carrying the fixed load of the vehicle. This is readily accomplished by putting the parts in place with the eye 19 expanded. After the load is on the spring and the shell has rotated in the eye so as to relieve the rubber member the eye is released, thus clamping the outer shell in this position. Where this is done the rubber member adds slightly to the resilience of the spring when it is depressed and tends to resist the rebound when the spring tends to move upwardly above the neutral position.

The joint at the upper end of the hanger is preferably provided with a clamp for securing the outer shell of the joint and this may be conveniently provided by forming the clamping members 21 and 22 which are secured by the bolts 23 to the frame 1. These bolts not only secure these members to the frame but clamp the outer shell of the joint against turning. Here it is desirable also to have the rubber free under the fixed load and this is accomplished by loosening the bolts until the spring is subjected to the weight and then locking the clamp on the outer shell.

It will be noted also that the rubber sustains any axial thrust of the bearing. This is made possible by the fact that the rubber is united by surface union within the outer and inner joint members so that the full strength is available for receiving this thrust. It will also be observed that when the joint is subjected to radial pressure that the one part of the joint is subjected to compression while the opposite part is subjected to tension. The surface union of the rubber with the joint members, therefore, assures the support of the rubber at what might be termed the tension side of the joint thus increasing to a very great extent the carrying capacity of the joint. It will be understood that when this joint is subjected to severe lateral pressure and oscillated the center of oscillation moves toward the compression point thus giving to the stretched portion somewhat less movement than where the oscillation is directly around the center of the inner joint member. This relieves to some extent the tendency to break the union between the rubber and the metal.

The knuckle 24 is of any ordinary type carried by the axle 3 and the tie rod is provided with a forked end 25, the arms of which form the plates 15 and 16. The outer shell is secured to the knuckle and the inner shell to the bolt 10, the other parts being provided and operating in the manner heretofore described. In this way it is possible to obviate practically all the oscillating joints of the vehicle which require very frequent lubrication and which through the absence of such lubrication become loose and rattle.

What I claim as new is:—

1. In an oscillating joint, the combination of two joint members spaced apart; and a rubber member bridging the space between the joint members and secured through a surface union with the joint members and sustaining the radial and torsional thrusts on the joint.

2. In an oscillating joint, the combination of two joint members spaced apart; and a rubber member bridging the space between the joint members and secured through a surface union with the joint members and sustaining the radial, torsional, and axial thrusts on the joint.

3. In an oscillating joint, the combination of two joint members spaced apart; and a rubber member bridging the space between the joint members and secured through a vulcanized union with the joint members and sustaining the radial and torsional thrusts on the joint.

4. In an oscillating joint, the combination of two joint members spaced apart, and a rubber member bridging the space between the joint members and secured through a vulcanized union with the joint members and sustaining the radial, torsional, and axial thrusts on the joint.

5. In an oscillating joint, the combination of an outer metal joint member; an inner metal joint member within the outer member and spaced from the wall of the outer joint member; and a rubber member in the space between the joint members and locked with the outer joint member and secured through a surface union with the inner joint member and sustaining the radial and torsional thrusts of the joint.

6. In an oscillating joint, the combination of an outer metal joint member; an inner metal joint member within the outer member and spaced from the wall of the outer joint member; and a rubber member in the space between the joint members and locked with the outer joint member and secured through a surface union with the inner joint member and sustaining the radial, axial and torsional thrusts of the joint.

7. In an oscillating joint, the combination of an outer metal joint member; an inner metal joint member within the outer member and spaced from the wall of the outer joint member; and a rubber member in the space between the joint members and locked with the outer joint member and secured through a vulcanized union with the inner joint member and sustaining the radial and torsional thrusts of the joint.

8. In an oscillating joint, the combination of an outer metal joint member; an inner metal joint member within the outer member and spaced from the wall of the outer joint member; and a rubber member in the space between the joint members and secured through a surface union with said joint members and receiving the radial and torsional thrusts of the joint.

9. In an oscillating joint, the combination of an outer metal joint member; an inner metal joint member within the outer member and spaced from the wall of the outer joint member; and a rubber member in the space between the joint members and secured through a vulcanized union with said joint members and receiving the radial and torsional thrusts of the joint.

10. In an oscillating joint, the combination of an outer metal joint member; an inner metal joint member within the outer member and spaced from the wall of the outer joint member; and a rubber member in the space between the joint members and secured through a vulcanized union with said joint members and receiving the radial, axial and torsional thrusts of the joint.

11. In a spring joint, the combination of a shackle bolt; a spring eye; and a rubber joint member arranged between the shackle bolt and spring eye, said rubber member being locked with the shackle bolt and with the spring eye and sustaining through its distortion the relative movement of the shackle bolt and spring eye.

12. In a spring joint, the combination of a spring bolt; a spring eye; and a rubber joint member arranged between the spring bolt and spring eye, said rubber member being locked with the spring bolt and with the spring eye and sustaining the thrust on the joint and through its distortion the relative movement of the spring bolt and spring eye.

13. In a spring joint, the combination of a shackle bolt; a spring eye; and a rubber joint member arranged between the shackle bolt and spring eye, said rubber member having a surface union with the metal carried by the shackle bolt and with the metal carried by the spring eye and sustaining the thrust on the joint and through its distortion the relative movement of the shackle bolt and spring eye.

14. In a spring joint, the combination of a shackle bolt; a spring eye; and a rubber joint member arranged between the shackle bolt and spring eye, said rubber member having a vulcanized union with the metal carried by the shackle bolt and with the metal carried by the spring eye and sustaining the thrust on the joint and through its distortion the relative movement of the shackle bolt and spring eye.

15. In a spring joint, the combination of a spring eye; a shackle bolt; and a rubber joint member arranged between the shackle bolt and the spring eye, said rubber member having a greater axial length than the width of the spring and having its outer part locked with the spring eye and its inner part locked with the shackle bolt.

16. In an oscillating joint, the combination of two joint members, one arranged within the other; a rubber member between said joint members; and a metal shell for the outer surface of the rubber member, said metal shell extending axially beyond the outer joint member, said rubber member being locked with the inner joint member and the metal shell being locked with the outer joint member.

17. In a spring joint, the combination of a spring eye; a shackle bolt; a rubber joint member between the shackle bolt and spring eye; and a metal shell arranged around the outer surface of the rubber member, the rubber member being locked with the shackle bolt and the shell, said shell being locked with the spring eye.

18. In a spring joint, the combination of a spring eye; a shackle bolt; a rubber joint member between the shackle bolt and spring eye; and a metal shell arranged around the outer surface of the rubber member, the rubber member being locked with the shackle bolt and the shell, said shell being locked with the spring eye through the clamping action of the eye.

19. In a spring joint, the combination of a spring eye; a shackle bolt; a rubber member between the spring eye and shackle bolt; a metal shell arranged within the rubber member; a metal shell arranged on the outer surface of the rubber member; and means for locking the metal shells with the shackle bolt and spring eye.

20. In an oscillating joint, the combination of a central bolt and outer member; a rubber member between the outer member and bolt and locked therewith; a metal shell within the rubber member; a metal shell without the rubber member; and means for locking the inner shell with the bolt and the outer shell with the outer joint member.

21. In an oscillating joint, the combination of a central pin; an outer member; a rubber member between the outer member and pin and locked therewith; a metal shell within the rubber member; and means for locking the metal shell with the pin.

22. In an oscillating joint, the combination of a central pin; an outer member; a rubber member between the outer member and the pin and locked therewith; a metal shell between the rubber and outer members; and means for locking the outer shell with the outer member.

23. In an oscillating joint, the combination of an inner bolt; a supporting plate; a rubber member; a shell within the rubber member and locked therewith; an end engaging surface on the shell locking with the supporting plate; and means for clamping the inner shell sidewise against the plate.

24. In an oscillating joint, the combination of an inner bolt; a supporting plate; a rubber member; a shell within the rubber member and locked therewith; an end engaging surface on the shell locking with the supporting plate; and means on the inner bolt for clamping the inner shell against the plate.

25. In an oscillating joint, the combination of a central bolt having a shoulder thereon; a supporting plate having a locking surface; a rubber joint member having a metal shell arrranged within said member and locked therewith, said shell having a locking surface for engaging the plate, the opposite surface engaging the shoulder on the bolt; and means on the bolt for clamping the shell against the plate.

26. An element of an oscillating joint comprising a cylindrical joint member adapted to sustain the joint action by distortion; and an outer metal shell and an inner pin secured to the rubber and adapted to lock the rubber with outer and inner joint members.

27. An element of an oscillating joint comprising a cylindrical joint member adapted to sustain the joint action by distortion; and inner and outer metal shells secured to the rubber and adapted to lock the rubber with outer and inner joint members, the inner metal shell having irregular surfaces for locking it with the inner joint member.

28. An element of an oscillating joint comprising a rubber joint member adapted to sustain by its distortion the movement of the joint; and an outer metal shell and an inner pin secured by vulcanization to different parts of the rubber and adapted to connect the rubber with members of a joint.

29. An element of an oscillating joint comprising a rubber joint member adapted to sustain by its distortion the thrust and oscillatory movement of the joint; and metal shells secured by surface union to different parts of the rubber and adapted to lock the rubber with members of a joint.

30. An element of an oscillating joint comprising a cylindrical joint member adapted to sustain the joint action by distortion; and inner and outer metal shells secured to the rubber by vulcanization and adapted to lock the rubber with outer and inner joint members.

31. In an oscillating joint, the combination of two joint members spaced apart; and a rubber member bridging the space between the joint members and locked with said joint members and sustaining the radial and torsional thrusts on the joint, the rubber being neutral at a point intermediate the extremes of the throw of the joint.

32. In a spring joint, the combination of a spring eye; a pin spaced from the spring eye and arranged therein; and rubber arranged in the space between the pin and the eye and locked with the pin and eye and sustaining by its distortion the relative oscillating motion between the eye and pin, said rubber being neutral at a point between the extremes of oscillatory movement between the spring eye and the pin.

33. In a spring joint, the combination of a spring eye; a pin spaced from the spring eye and arranged therein; and rubber arranged in the space between the pin and the eye and locked with the pin and eye and sustaining by its distortion the relative oscillating motion between the eye and pin, the rubber being neutral at a point adjacent to the load position of the spring.

In testimony whereof I have hereunto set my hand.

HUGH C. LORD.